US012717049B2

(12) United States Patent
Tomiyama et al.

(10) Patent No.: US 12,717,049 B2
(45) Date of Patent: Aug. 25, 2026

(54) RADIATION DETECTOR

(71) Applicant: HAMAMATSU PHOTONICS K.K., Hamamatsu (JP)

(72) Inventors: Hiroyuki Tomiyama, Hamamatsu (JP); Tetsuya Taka, Hamamatsu (JP)

(73) Assignee: HAMAMATSU PHOTONICS K.K., Hamamatsu (JP)

(*) Notice: Subject to any disclaimer, the term of this patent is extended or adjusted under 35 U.S.C. 154(b) by 20 days.

(21) Appl. No.: 18/681,210

(22) PCT Filed: May 30, 2022

(86) PCT No.: PCT/JP2022/022013
§ 371 (c)(1),
(2) Date: Feb. 5, 2024

(87) PCT Pub. No.: WO2023/017664
PCT Pub. Date: Feb. 16, 2023

(65) Prior Publication Data
US 2024/0310534 A1 Sep. 19, 2024

(30) Foreign Application Priority Data
Aug. 10, 2021 (JP) ................................ 2021-130799

(51) Int. Cl.
*G01T 1/20* (2006.01)

(52) U.S. Cl.
CPC ................................. *G01T 1/2002* (2013.01)

(58) Field of Classification Search
None
See application file for complete search history.

(56) References Cited

U.S. PATENT DOCUMENTS 4,809,308 A * 2/1989 Adams ................ G01N 23/083 378/98.2
7,057,187 B1 6/2006 Yun et al.
(Continued)

FOREIGN PATENT DOCUMENTS

CN 108474754 A 8/2018
EP 0236001 A2 9/1987
(Continued)

OTHER PUBLICATIONS

Extended European Search Report issued on Apr. 24, 2025 in corresponding European patent application 22855728.6.
(Continued)

*Primary Examiner* — Hoon K Song
(74) *Attorney, Agent, or Firm* — Faegre Drinker Biddle & Reath LLP

(57) ABSTRACT

A radiation detector includes a positioning member having a through hole through which radiation passes, a scintillator having an input surface to which the radiation passing through the through hole is input and configured to convert the radiation into scintillation light, a sensor unit having a light-receiving surface that receives the scintillation light converted by the scintillator and configured to detect the scintillation light, and a lens unit having a lens configured to perform image capturing on the input surface of the scintillator and the light-receiving surface of the sensor unit. The positioning member has a first positioning portion with which the input surface of the scintillator comes into contact to position the scintillator and a second positioning portion with which one end face of the lens unit comes into contact to position the lens unit.

9 Claims, 9 Drawing Sheets

(56) References Cited

U.S. PATENT DOCUMENTS

| | | | |
|---|---|---|---|
| 2010/0140487 | A1 | 6/2010 | Barrett et al. |
| 2010/0230605 | A1 | 9/2010 | Partouche-Sebban et al. |

FOREIGN PATENT DOCUMENTS

| | | | |
|---|---|---|---|
| EP | 4212915 | A1 | 7/2023 |
| JP | 2010-156646 | A | 7/2010 |
| JP | 2012-093208 | A | 5/2012 |
| JP | 2015-232491 | A | 12/2015 |
| JP | 2016-095248 | A | 5/2016 |
| JP | 2016-223997 | A | 12/2016 |
| JP | 2019-191059 | A | 10/2019 |
| JP | 2020-139817 | A | 9/2020 |
| JP | 2020-160079 | A | 10/2020 |
| KR | 10-2019-0101211 | A | 8/2019 |

OTHER PUBLICATIONS

International Preliminary Report on Patentability mailed Feb. 22, 2024 for PCT/JP2022/022013.

* cited by examiner 1
2
26
12
D
A
14
C
21a
21a
14a
21
20
21
13e
30
14f
6a
13b
13
15
6
15
13

1
2
2a
26
12
D
A
21
20
21a
C
70
74
80
6
7
60
3
13
14a
13e
13a
21
z
y
x
10
10a
CONTROL UNIT
10b
IMAGE PROCESSING UNIT
11
DISPLAY DEVICE 30
79
89
70
77
71
80
70a
82
14f
7a
62
70c
7b
9
3a
31
14a
13e
13a
6
70d
78
6c
76
69
72
61
8
7
7c
60
32
3
13
74
6a
75
65
33
V
V
z
y
x 62
15
13
14a
7a
70
13e
60
7
z
x
y 70
79
14f
30
14a
80
13
15
z
x
y 70
73
79
78
14f
30
74
70d
14a
75
77
73
13
15
z
x
y

RADIATION DETECTOR

TECHNICAL FIELD

The present disclosure relates to a radiation detector.

BACKGROUND ART

A radiation detector including a phosphor that converts radiation into light and a sensor unit that senses light from the phosphor is known (for example, see Patent Literature 1). Such a radiation detector is used in an inspection apparatus or imaging device including a radiation source. The radiation detector detects radiation applied from the radiation source to an object and passing through the object. In the radiation detector disclosed in Patent Literature 1, the sensor unit is supported on the first support member, and the phosphor is supported on the second support member. The second support member is fitted to the first support member. The sensor unit is surrounded by the first support member and the protective member attached to the first support member. The protective member is provided with an opening. Light from the phosphor enters the sensor unit through the opening.

CITATION LIST

Patent Literature

Patent Literature 1: Japanese Unexamined Patent Publication No. 2019-191059

SUMMARY OF INVENTION

Technical Problem

In the conventional radiation detector described above, the surface of the phosphor is tilted with respect to both the +Z direction and the +X direction so as to face both the +Z direction in which the source from which radiation comes exists and the +X direction in which the sensor unit exists. The relative position between the sensor unit supported on the first support member and the phosphor supported on the second support member is maintained by fixing the relative placement between the first support member and the second support member. Meanwhile, phosphors (scintillators) can have various thicknesses. In a conventional radiation detector, the position of the surface of the phosphor is determined by the position and the height of the second support member, but the position of the surface depends on the thickness of the phosphor if the phosphor changes in thickness.

As a result of a change in the position of the surface of the phosphor (that is, the input surface to which radiation is input), the distance between the sensor unit and the surface of the phosphor can change. As the distance between the sensor unit and the surface of the phosphor changes, for example, problems can occur, such as difficulty in performing desired imaging with the lens disposed between the phosphor and the sensor unit.

The present disclosure describes a radiation detector that can easily ensure the positional accuracy of the input surface of a scintillator and can accordingly maintain the distance between the sensor unit and the input surface of the scintillator constant.

Solution to Problem

The following are constituent elements according to one aspect of the present disclosure.

[1] A radiation detector includes a positioning member having a through hole through which radiation passes, a scintillator having an input surface to which the radiation passing through the through hole is input and configured to convert the radiation into scintillation light, a sensor unit having a light-receiving surface that receives the scintillation light converted by the scintillator and configured to detect the scintillation light, and a lens unit having a lens configured to perform image capturing on the input surface of the scintillator and the light-receiving surface of the sensor unit. The positioning member has a first positioning portion with which the input surface of the scintillator comes into contact to position the scintillator and a second positioning portion with which one end face of the lens unit comes into contact to position the lens unit.

According to this radiation detector, the positioning member as a single member positions the scintillator with the first positioning portion and positions the lens unit with the second positioning portion. Since the first positioning portion comes into contact with the input surface of the scintillator, even if the scintillator changes in thickness, for example, the positional accuracy of the input surface can be easily ensured. This makes it possible to maintain the distance between the sensor unit and the input surface of the scintillator constant. This configuration eliminates the necessity to consider the positional accuracies of different members and hence is superior to conventional detectors. This will maintain the distance between the input surface of the scintillator and one end face of the lens unit constant and ensure the accuracy of the focal length.

In some aspects, the constituent elements of the present disclosure may be described as follows.

[2] In the radiation detector described in [1], the first positioning portion comes into surface contact with the input surface of the scintillator.

This configuration makes it possible to easily stabilize the posture of the scintillator. The positional accuracy of the input surface of the scintillator is further improved.

[3] In the radiation detector described in [1] or [2], the second positioning portion comes into surface contact with the one end face of the lens unit.

This configuration makes it possible to reliably and easily fix the position of the lens unit. The positional accuracy of the lens unit is further improved.

[4] The radiation detector described in any one of [1] to [3] further includes a holding member configured to hold the lens unit and the sensor unit. The holding member has a surface facing a side surface on which the second positioning portion of the positioning member is formed, and the one end face of the lens unit is exposed on the surface.

According to this configuration, the relative position among the sensor unit, the lens unit, and the scintillator is determined by only attaching the positioning member to the holding member.

[5] In the radiation detector described in [4], the positioning member and the holding member are fixed with a gap between the side surface and the surface.

According to this configuration, the heat generated by the sensor unit is not easily transferred to the positioning member. By protecting the positioning member from heat, the distance between the first positioning portion and the second positioning portion is made invariant and can be easily maintained. Even if lens characteristics vary, the influence of the variation can be compensated.

[6] In the radiation detector according to any one of [1] to [5], the positioning member has a recess portion that receives an end edge of the scintillator.

This configuration makes it possible to easily fix the position of the scintillator.

[7] The radiation detector described in any one of [1] to [6] further includes a support member that is fitted to the positioning member to support the scintillator. The support member has a support surface facing an attachment surface on which the first positioning portion of the positioning member is formed and holds the scintillator between the attachment surface and the support surface.

This configuration makes it possible to reliably support and fix the scintillator by only fitting the support member to the positioning member.

[8] In the radiation detector described in [7], the support member is fixed to the positioning member so as to allow adjustment of an interval between the attachment surface and the support surface.

This configuration makes it possible to adapt scintillators with any thickness.

Advantageous Effects of Invention

According to some aspects of the present disclosure, it is possible to easily ensure the positional accuracy of the input surface of a scintillator and accordingly maintain the distance between the sensor unit and the input surface of the scintillator constant.

DESCRIPTION OF EMBODIMENTS

Figure 1:
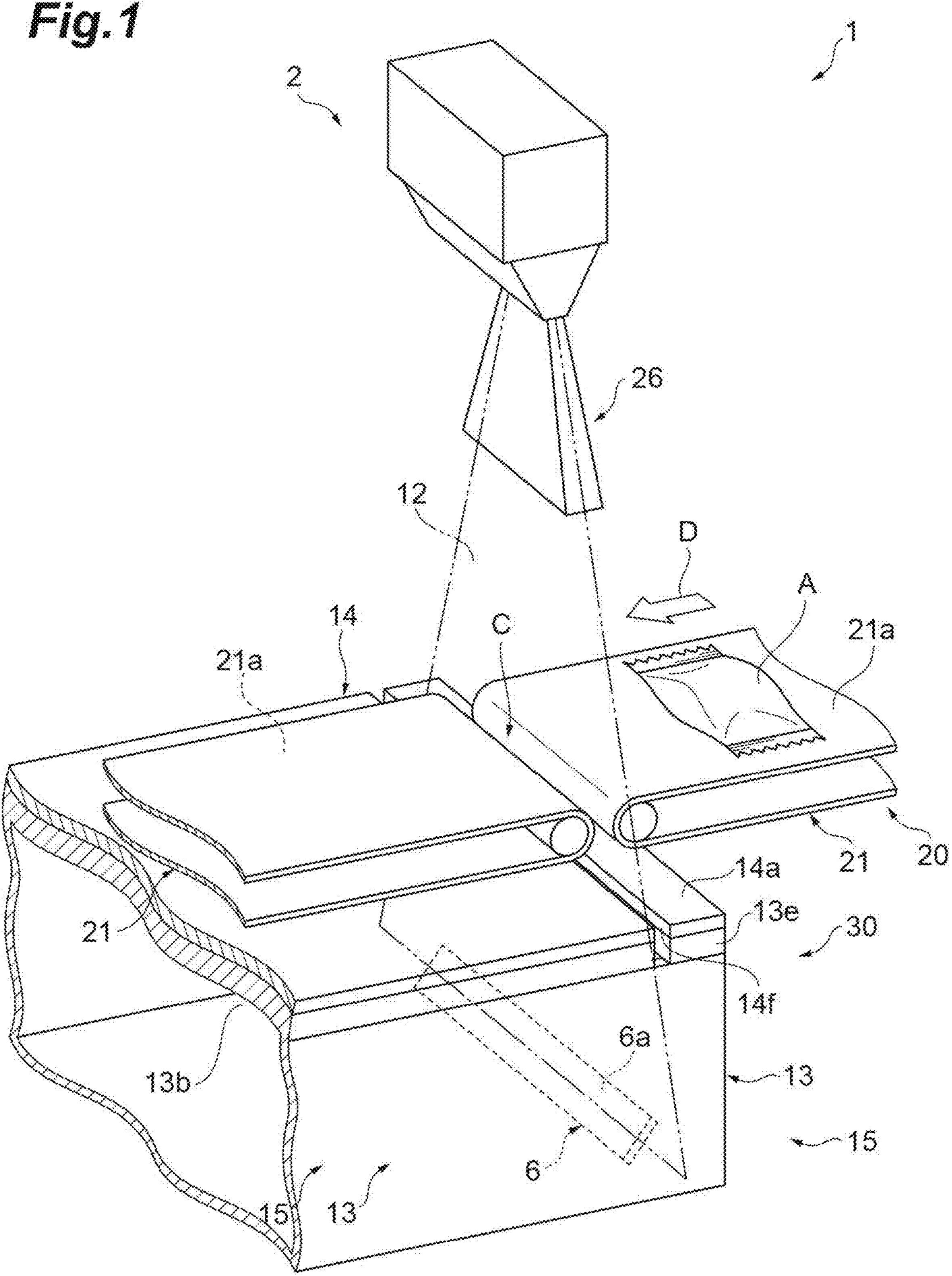
FIG. 1 is a perspective view showing a radiological image acquisition system according to one embodiment of the present disclosure.

Hereinafter, embodiments of the present disclosure will be described below with reference to the accompanying drawings. Note that the same reference signs denote the same elements in the description of the drawings, and any overlapping description will be omitted. Also, the respective drawings are prepared for the purpose of description, and are drawn so that the portions to be described are particularly emphasized. Therefore, the dimensional ratios of respective members in the drawings are not always coincident with actual ratios.

Figure 2:
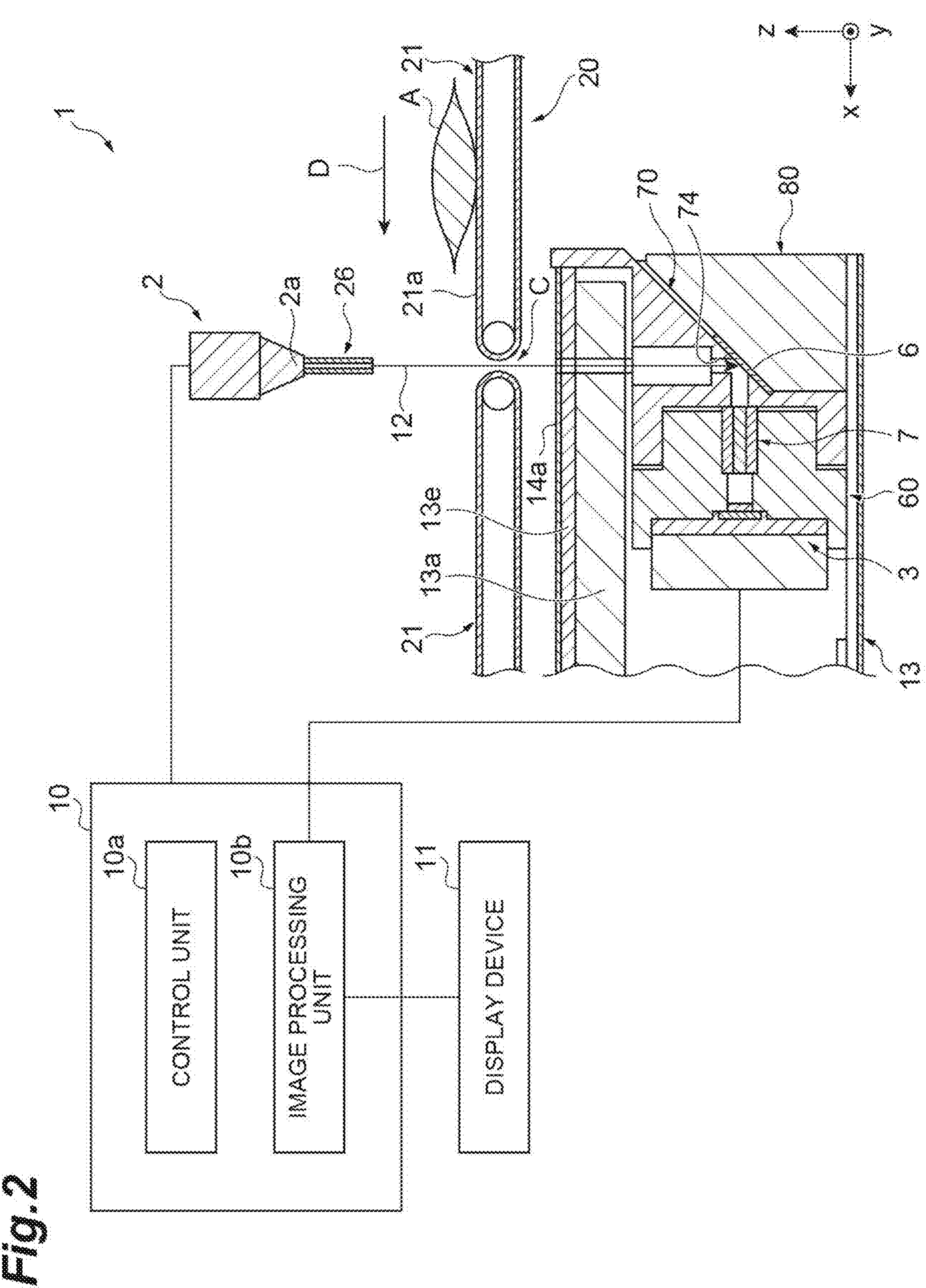
FIG. 2 is a view showing the schematic configuration of the radiological image acquisition system shown in FIG. 1.

As shown in FIGS. 1 and 2, a radiological image acquisition system 1 according to one embodiment is an apparatus for acquiring a radiological image of an object A. The radiological image acquisition system 1 is a non-destructive inspection system that can inspect the object A without disassembly, destruction, or the like. The object A contains, for example, a substance composed of a light element. The radiological image acquisition system 1 is applied to, for example, fields such as food inspection, battery inspection, and electronic component inspection. In the field of food inspection, for example, the presence or absence of foreign matter getting caught in sealed containers and packaging is inspected. The radiological image acquisition system 1 is particularly excellent in performance for distinguishing a substance composed of a light element. Such substances include, for example, food debris, hair, plastic, insects, and bones in meat. The radiological image acquisition system 1 is applied to, for example, inline X-ray inspection.

The radiological image acquisition system 1 includes a radiation source 2 that outputs radiation such as white X-rays toward the object A, a conveying apparatus 20 that conveys the object A in a predetermined conveying direction D, a scintillator 6 that generates scintillation light in accordance with the input of radiation transmitted through the object A conveyed by the conveying apparatus 20, a line scan sensor (sensor unit) 3 that detects scintillation light output from a radiation input surface **6*a* of the scintillator 6, and a computer 10 that controls several functions of the radiological image acquisition system 1 and generates a radiological image. As described above, the radiological image acquisition system 1 is an X-ray photographing system based on a scintillator obverse surface observation scheme. The radiological image acquisition system 1** is excellent in low-energy X-ray sensitivity.

The radiation source 2 outputs cone beam X-rays from an X-ray emission portion. The radiation source 2 has a focus **2*a* of cone beam X-rays. The radiation source 2 may be, for example, a microfocus X-ray source or millifocus X-ray source. The X-rays emitted from the radiation source 2 form a radiation flux. The radiological image acquisition system 1 is provided with a radiation source side slit member 26 and a positioning member 70 (see FIG. 2) to input X-rays in an irradiation region 12, which is a narrowed part of X-rays in the output region in which a radiation flux is present, to the input surface 6*a* of the scintillator 6. The irradiation region 12 extends in a triangular shape (or fan shape) toward the scintillator 6 in a housing 15 of a radiation detector 30**.

The conveying apparatus 20 includes, two belt conveyors 21, 21 that move along, for example, an orbital path. The object A is placed or held on a conveying surface **21*a* of the belt conveyor 21. The belt conveyor 21 is a conveying stage or conveying unit. The conveying apparatus 20 includes a drive source (not shown) that drives each belt conveyor 21. The conveying apparatus 20 is configured to convey the object A in the conveying direction D at a constant speed. In this embodiment, the conveying direction D is the horizontal direction. A gap C that allows X-rays to pass through is provided at a position corresponding to the irradiation region 12 described above between the two belt conveyors 21, 21. The gap C has a small constant length (width) in the conveying direction D and linearly extends in the horizontal detection width direction orthogonal to the conveying direction D. A conveying timing and a conveying speed are set in advance for the object A in the conveying apparatus 20 and are controlled by a control unit 10*a* of the computer 10. Note that the belt conveyors 21, 21 need not have the gap C that allows X-rays to pass through, and the belt member of each belt conveyor 21 may be formed from a radiotransparent material. The conveying direction D shown in FIGS. 1 and 2 is parallel to the x direction parallel to the drawing surface shown in FIGS. 1 and 2. The above detection width direction is parallel to the y direction perpendicular to the drawing surface shown in FIG. 2. The up-down direction is parallel to the z direction parallel to the drawing surface shown in FIG. 2**.

Note that the radiological image acquisition system 1 is compatible with conveying apparatuses 20 of all types. For example, the conveying direction D may be horizontal or tilted with respect to the horizontal direction. The conveying direction D may not be linear and may be, for example, curved. In this case, the conveying direction D may be a tangent to a portion of the conveying path for the object A which overlaps the irradiation region 12. The conveying apparatus 20 may not have the physical conveying surface 21*a*. For example, the conveying apparatus 20 may convey the object A while levitating it by air. Alternatively, the conveying apparatus 20 may convey the object A by ejecting the object A into air. In this case, the conveying path for the object A may be, for example, parabolic in shape.

The conveying apparatus 20 is not limited to the form having the belt conveyors 21. For example, the conveying apparatus 20 may have a roller conveyor including a plurality of rollers. The roller conveyor has no belt, and hence can be free from the influence of the belt. A roller conveyor is also advantageous over a belt conveyor in that gaps (slit-shaped openings) are formed between the rollers. Using the roller conveyor will reduce X-ray attenuation caused by the belt. In consideration of the placement of the radiation source 2 and the placement of the irradiation region 12 (oblique irradiation) (to be described later), the roller conveyor can be used effectively. The roller conveyor is a conveying means suitable for the radiological image acquisition system 1 having importance on low-energy X-ray sensitivity. As in this embodiment, two or more belt conveyors may be installed in the conveying direction, and X-rays may be applied from the gap C between the belt conveyors. This form can eliminate the influence of the belts while using the belt conveyors 21.

Figure 3:
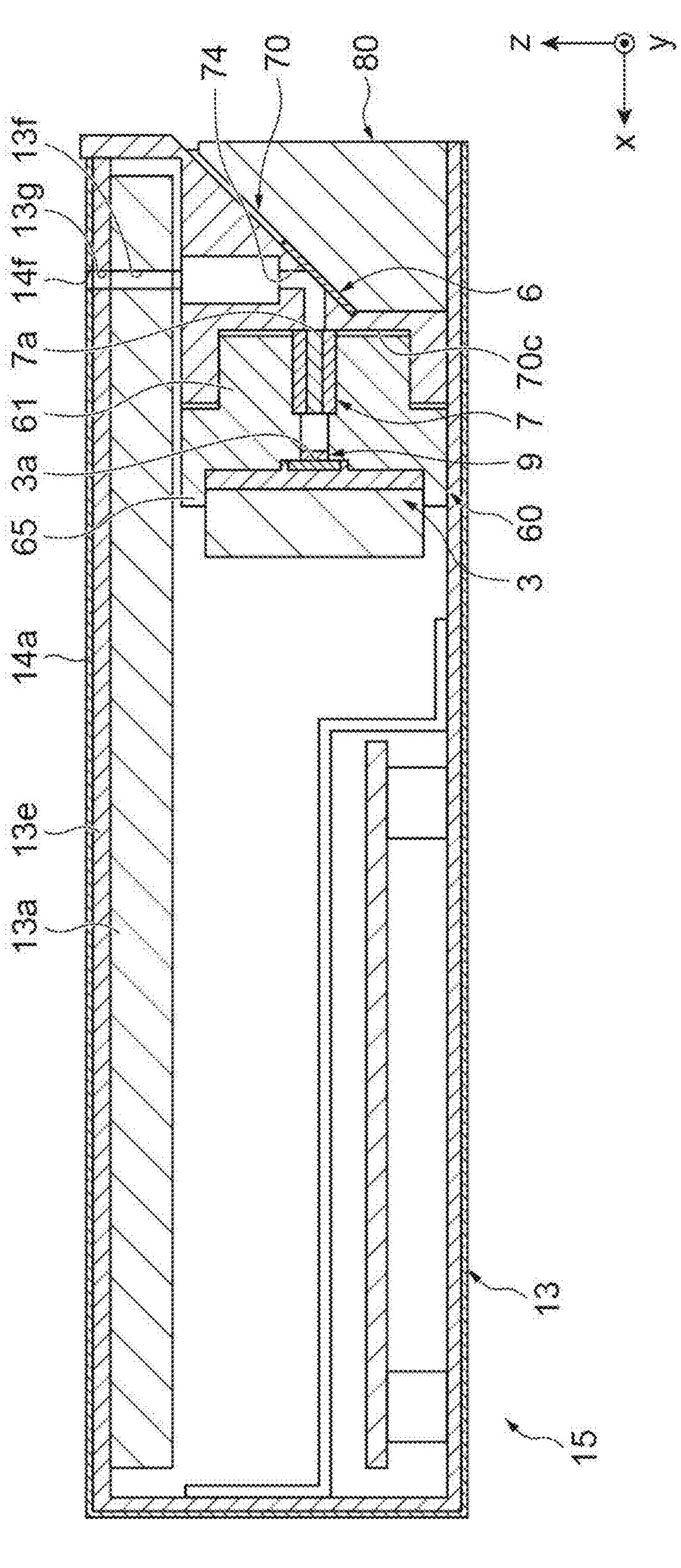
FIG. 3 is a sectional view showing the internal configuration of a radiation detector in FIG. 1.

As shown in FIGS. 1 to 3, the radiological image acquisition system 1 includes the radiation detector 30 installed along the conveying apparatus 20. The radiation detector 30 is an imaging unit for capturing a radiological image of the object A. The radiation detector 30 is attached to, for example, the conveying apparatus 20 and fixed to the conveying apparatus 20. The radiation detector 30 may be attached to anything other than the conveying apparatus 20. The radiation detector 30 may be mounted on the base or the like. The radiation detector 30 is attached so as not to interfere with the circular motion of the belt conveyors 21. The same applies to a case in which the conveying apparatus 20 is a roller conveyor. The radiation detector 30 is placed with some gap from the conveying unit such as a belt conveyor or roller conveyor so as not to interfere with the movement of the conveying unit.

The radiation detector 30 includes the housing 15 having a rectangular parallelepiped shape. The housing 15 includes, for example, a housing body 13 having a rectangular parallelepiped shape and formed from aluminum and a lead cover 14 covering the outer surface (outer periphery) of the housing body 13. The housing body 13 accommodates the respective components of the radiation detector 30. The lead cover 14 shields against radiation to prevent radiation outside the housing body 13 from affecting the internal space of the radiation detector 30. The lead cover 14 may be placed outside or inside the housing 15. Another cover may be attached to the outside of the lead cover 14. From the viewpoint of the strength and handling of lead, another material is preferably attached to the outside of the lead. A substance other than lead may be used as a material for the cover. For example, tungsten, iron, stainless steel, or copper may be used. Alternatively, a rubbery material or sheet-like material obtained by containing a heavy metal such as tungsten in rubber (resin) may be used.

The housing body 13 is formed from, for example, a material that can shield against X-rays. The housing body 13 may be formed from iron, stainless steel, or the like. The housing body 13 may contain a protective material. As the protective material, lead, tungsten, or copper may be used. Alternatively, a rubbery material or sheet-like material obtained by containing a heavy metal such as tungsten in rubber (resin) may be used.

An upper wall portion 13*a* of the housing body 13 is placed to face the conveying apparatus 20. A top plate portion 14*a* of the lead cover 14 is attached on the upper wall portion 13*a* with a gap from the upper wall portion 13*a*. The top plate portion 14*a* is placed parallel to the upper wall portion 13*a*. A cover wall portion 13*e* formed from aluminum is provided between the upper wall portion 13*a* and the top plate portion 14*a*. Note that the cover wall portion 13*e* may be formed from a metal such as stainless steel or iron.

The lead cover 14 covers, for example, the entire surface of the housing body 13 except for the bottom wall portion. (The illustration of the lead cover 14 is omitted except for the top plate portion 14*a*.) An entrance window 14*f* that allows X-rays transmitted through the object A to pass through is formed in the top plate portion 14*a* of the lead cover 14. The entrance window 14*f* has a small constant length (width) in the x direction and linearly extends in the y direction. The length of the entrance window 14*f* in the x direction may be determined by the width of the slit formed by a first through hole 74 (to be described later) or the desired width of the irradiation region 12 (the thickness in the conveying direction D).

Through holes 13*g* and 13*f* (see FIG. 3) having a constant length (width) in the x direction and linearly extending in the y direction are formed in the cover wall portion 13*e* and the upper wall portion 13*a* at positions corresponding to the entrance window 14*f*. The entrance window 14*f* of the top plate portion 14*a*, the through hole 13*g* of the cover wall portion 13*e*, and the through hole 13*f* of the upper wall portion 13*a*, each having a predetermined length in the x direction, are arranged in the thickness direction to form the first portion of a slit as a radiation passage.

The radiation detector 30 is configured to be capable of capturing an image of scintillation light output from the input surface 6*a* of the scintillator 6 in a direction tilted with respect to the input surface 6*a*. In the housing 15, the scintillator 6, the line scan sensor 3, and a 1× lens (lens unit) 7 are installed. The 1× lens 7 is disposed between the scintillator 6 and the line scan sensor 3. The radiation detector 30 has a structure for holding a predetermined positional relationship between the scintillator 6, the line scan sensor 3, and the 1× lens 7. In the radiation detector 30, a substrate and the like are arranged in a space expanding from the position of the line scan sensor 3 in the x direction (conveying direction D). The layout of various members in the housing 15 can be changed in accordance with the application destination or installation place of the radiation detector, a desired surrounding layout, and the like.

Figure 4:
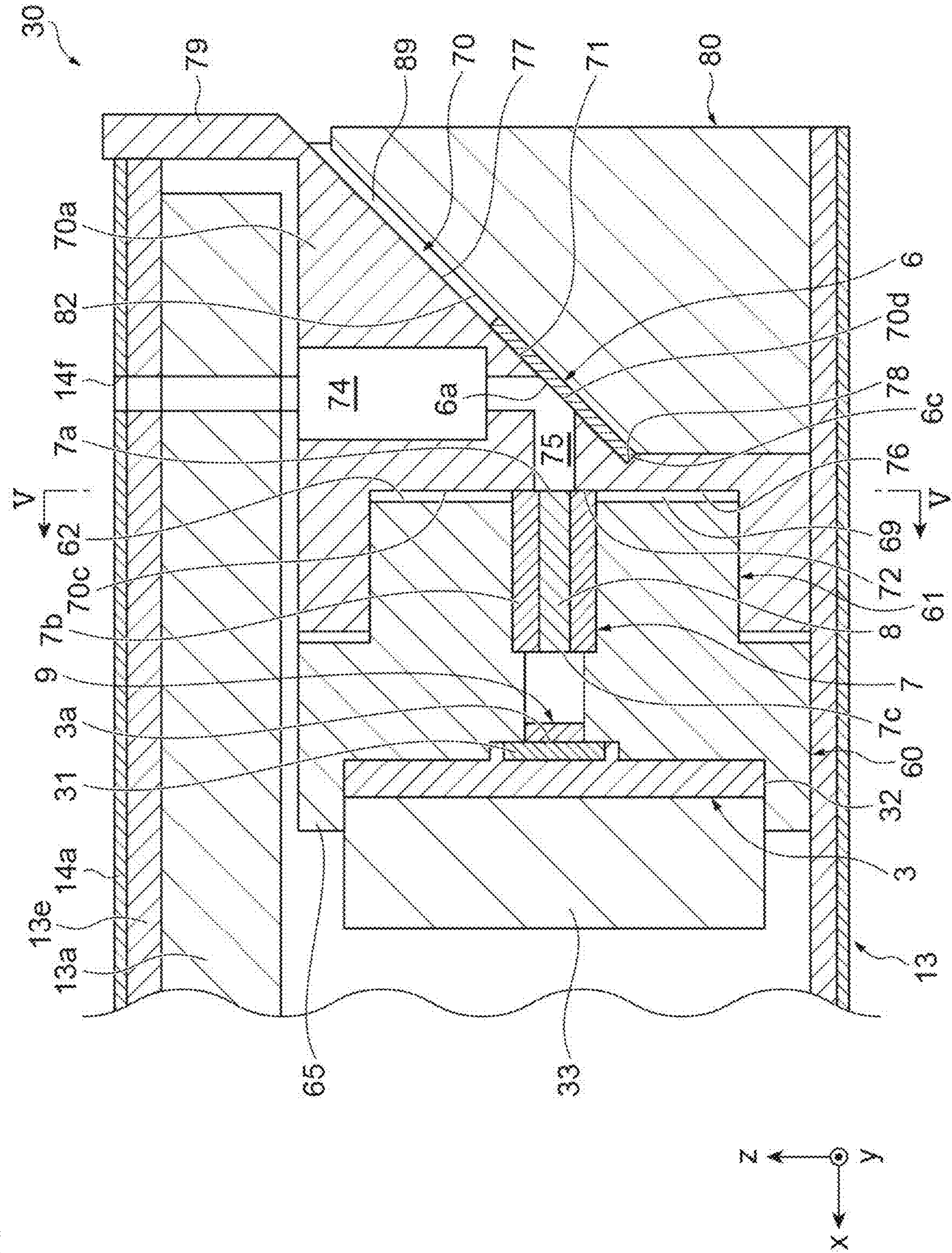
FIG. 4 is an enlarged sectional view of a portion in FIG. 3.

As shown in FIGS. 3 and 4, the radiation detector 30 includes a holding member 60 that holds the 1× lens 7 and the line scan sensor 3, the positioning member 70 that positions the scintillator 6, and a support member 80 that is fitted to the positioning member 70 to support the scintillator 6. The holding member 60, the positioning member 70, and the support member 80 are attached to the housing body 13 of the housing 15 and fixed at predetermined positions. The configurations of the scintillator 6, the line scan sensor 3, and the 1× lens 7 and a configuration for holding these members will be described below. Note that FIG. 1 omits the illustration of the positioning member 70 and the support member 80.

The scintillator 6 is held by, for example, a scintillator holder (not shown) so as to be disposed, for example, horizontally. The scintillator 6 is a flat wavelength conversion member. The scintillator 6 has, for example, a substantially constant thickness. The scintillator 6 has a rectangular shape longer in the detection width direction (y direction) (see FIGS. 1 and 9). The scintillator 6 is made of, for example, $Gd_2O_2S$:Tb, $Gd_2O_2S$:Pr, CsI:Tl, $CdWO_4$, $CaWO_4$, $Gd_2SiO_5$:Ce, $Lu_{0.4}Gd_{1.6}SiO_5$, $Bi_4Ge_3O_{12}$, $Lu_2SiO_5$:Ce, $Y_2SiO_5$, $YAlO_3$:Ce, $Y_2O_2S$:Tb, $YTaO_4$:Tm, YAG:Ce, YAG:Pr, YGAG:Ce, YGAG:Pr, GAGG:Ce, or the like. The thickness of the scintillator 6 is set to a proper value depending on the energy band of radiation detected in the range of several μm to several mm. The scintillator 6 converts the X-rays transmitted through the object A into visible light (scintillation light). X-rays with relatively low energy are converted by the input surface 6*a* of the scintillator 6 and output from the input surface 6*a*.

The line scan sensor 3 performs image capturing in accordance with the movement of the object A and outputs radiological image data as one-dimensional image data. An imaging unit 31 of the line scan sensor 3 has an imaging surface 3*a* that captures an image of scintillation light output from the input surface 6*a* of the scintillator 6. The imaging surface 3*a* is a light-receiving surface that receives scintillation light. The line scan sensor 3 is, for example, a general line sensor, a multiline sensor, or an area image sensor that can be TDI (time delay integration)-driven. The line scan sensor 3 is, for example, a CCD image sensor or a CMOS image sensor. The line scan sensor 3 has a configuration in which one or a plurality of element rows each having a plurality of light-receiving elements arranged in series in the pixel direction are arranged in the column direction. Referring to FIG. 2, the column direction is a direction parallel to the Z direction. The line scan sensor 3 has a scan direction corresponding to the conveying direction D of the object A and a line direction orthogonal to the scan direction. This line direction is the above pixel direction, which is parallel to the y direction in FIG. 2. The scan direction corresponds to the column direction described above, which is parallel to the z direction in FIG. 2. In the case of the area image sensor that can be TDI-driven, the column direction is the same direction as the integration direction.

The control unit 10*a* controls the line scan sensor 3 so as to capture an image of the object A in accordance with the movement of the object A. That is, the line scan sensor 3 captures an image on the imaging surface 3*a* in synchronism with the movement of the object A by the conveying apparatus 20 and outputs radiological image data. This makes it possible to obtain a radiological image with a high S/N ratio. In order to synchronize the movement of the object A by the stage with image capturing by the line scan sensor, the stage may be provided with an encoder to control the line scan sensor 3 in accordance with a signal from the encoder.

In this embodiment, the scintillator 6 is disposed, for example, such that the input surface 6*a* is tilted with respect to the conveying direction D and parallel to the above line direction.

As shown in FIG. 3, the holding member 60 is accommodated in the housing body 13. The holding member 60 has a positioning portion 61 functioning as a guide. The holding member 60 holds the 1× lens 7 at the positioning portion 61 of the holding member 60 facing the scintillator 6. The holding member 60 further holds the line scan sensor 3 at a proximal end portion 65 on the opposite side to the positioning portion 61. The holding member 60 holds the 1× lens 7 such that, for example, one end face 7*a* of the 1× lens 7 is orthogonal to the x direction. The holding member 60 holds the line scan sensor 3 such that the imaging surface 3*a* of the imaging unit 31 is, for example, orthogonal to the x direction. As shown in FIG. 4, the imaging unit 31 of the line scan sensor 3 is held on a main body portion 32 attached on a base portion 33. Part of the base portion 33 and the main body portion 32 are fitted in the proximal end portion 65 of the holding member 60.

As shown in FIGS. 3 and 4, the positioning member 70 is incorporated in the housing body 13 at a position immediately below the entrance window 14*f*. The positioning member 70 is made of, for example, a metal such as copper. The positioning member 70 has a first through hole 74 through which radiation passes and a second through hole 75 through which the scintillation light converted by the scintillator 6 and output from the scintillator 6 passes. The first through hole 74 is formed along, for example, a y-z plane, and the second through hole 75 is formed along, for example, an x-y plane. The length of the first through hole 74 and the second through hole 75 in the y direction is larger than the length of the scintillator 6 in the y direction. The first through hole 74 communicates with the second through hole 75 through a space extending in the y direction. The positioning member 70 has an attachment surface 77 extending obliquely to the first through hole 74, that is, the radiation passage. The attachment surface 77 is tilted, for example, at 45° with respect to the x-y plane. The support member 80 presses the scintillator 6 against the attachment surface 77. The space in which the first through hole 74 communicates with the second through hole 75 opens to the attachment surface 77. The input surface 6*a* of the scintillator 6 faces an opening 70*d*. Setting the tilt angle of the attachment surface 77 as appropriate will determine the angle of the input surface 6*a* with respect to radiation input to the input surface 6*a* and the angle of the input surface 6*a* with respect to the imaging surface 3*a*. The tilt angle (45°) of the attachment surface 77 described above is merely an example. The attachment surface 77 may be tilted at another angle with respect to the x-y plane.

The first through hole 74 forms the second portion of a slit serving as a radiation passage and cooperates with the first portion described above to guide the X-rays passing through the entrance window 14*f* toward the input surface 6*a* of the scintillator 6. The positioning member 70 prevents X-rays in the internal space of the housing 15 from scattering. The X-rays (radiation) in the irradiation region 12 which have passed through the first through hole 74 of the positioning member 70 are input to the input surface 6*a* of the scintillator 6.

In the radiological image acquisition system 1, a shielding member 9 is attached, for example, between the line scan sensor 3 and the 1× lens 7. The line scan sensor 3, the shielding member 9, and the 1× lens 7 are integrated.

The shielding member 9 is a radiation shielding member that transmits the scintillation light generated by the scintillator 6 and condensed by the 1× lens 7 and shields against X-rays. The shielding member 9 is, for example, lead-containing glass, lead-free radiation shielding glass containing a heavy element such as Sr, Ba, Ti, B, W, Si, Gd, or Zr, an FOP (fiber optic plate), a radiation shielding resin, or the like. The shielding member 9 is attached to the surface of the line scan sensor 3 (the surface of a protective resin). The shielding member 9 reduces the influence of scattered X-rays. The shielding member 9 is, for example, a plate-like member provided on the line scan sensor 3 but may be a block-like member provided throughout the space between the imaging surface 3*a* of the line scan sensor 3 and another end face 7*c* of the 1× lens 7. That is, a gap may or may not be formed between the shielding member 9 and the 1× lens 7.

The 1× lens 7 is placed between the scintillator 6 and the line scan sensor 3 and forms the scintillation light output from the input surface 6*a* into an image on the imaging surface 3*a* of the line scan sensor 3. The 1× lens 7 is a lens having a magnification of 1 and can be implemented by, for example, a refractive index distribution lens (GRIN lens), rod lens, or rod lens array. The 1× lens 7 is focused on the input surface 6*a* of the scintillator 6. Since the 1× lens 7 has a large depth of field, even if a phosphor is obliquely imaged, the defocusing is small. That is, this lens is advantageous for oblique image capturing as in this embodiment. In addition, the 1× lens 7 increases the degree of freedom in combining the placements of the radiation source 2, the object A, and the line scan sensor 3.

Figure 6:
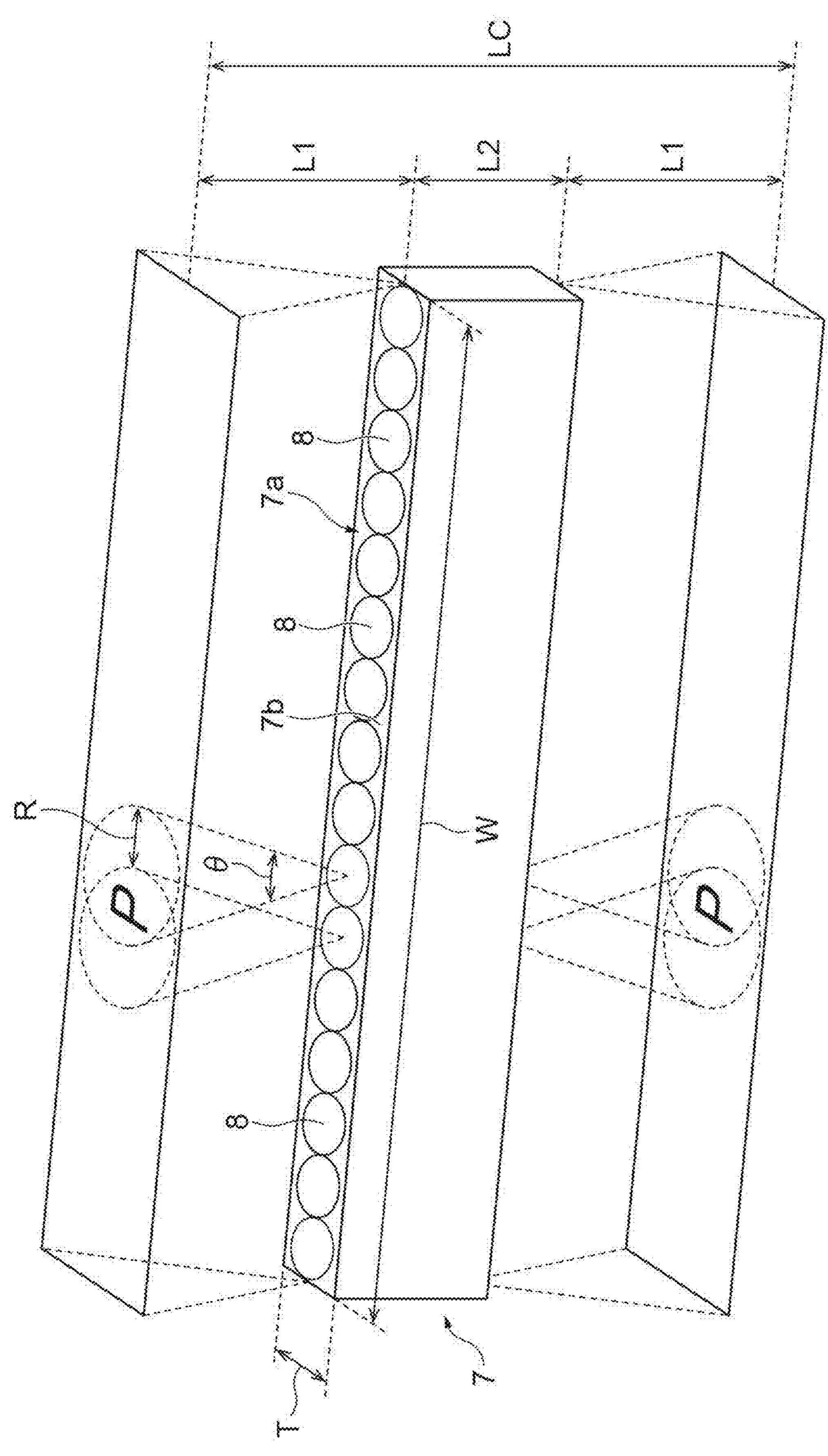
FIG. 6 is a view showing the schematic configuration of a lens unit according to one example.

FIG. 6 is a view showing the schematic configuration of the 1× lens 7 according to an example. As shown in FIG. 6, the 1× lens 7 has a rectangular parallelepiped shape. The 1× lens 7 has a structure in which, for example, many columnar lens bodies (lenses) 8 arranged in a line are held by a lens holding portion 7*b*. The 1× lens 7 has a total length W, a thickness T, and a lens length L2. Each lens body 8 has an aperture angle θ and a visual field radius R. With the lens bodies 8 arranged in an array, the 1× lens 7 forms light into an image on the input surface 6*a* of the scintillator 6 and the imaging surface 3*a* of the line scan sensor 3. One end face 7*a* and the other end face 7*c* of the 1× lens 7 in the direction of the lens length L2 are parallel to each other and are formed into flat surfaces. Both end faces of the lens body 8 are exposed to one end face 7*a* and the other end face 7*c* and flush with both end faces of the lens holding portion 7*b*. The adjacent lens bodies 8 of the 1× lens 7 are arranged such that images overlap. Since the lens bodies 8 are arranged in an array, no brightness difference occurs at the central portion and end portions of the array, and no lens distortion occurs at the end portions. An operating distance L1 on one end face 7*a* side and the operating distance L1 on the opposite side shown in FIG. 6 respectively correspond to the distance between the input surface 6*a* and the one end face 7*a* and the distance between the other end face 7*c* and the imaging surface 3*a* shown in FIG. 4. That is, a conjugation length LC of the 1× lens 7 corresponds to the distance between the input surface 6*a* and the imaging surface 3*a*.

Referring back to FIG. 4, in the radiation detector 30, the radiation passage formed by the first through hole 74 is placed obliquely to the normal direction of the input surface 6*a* of the scintillator 6. The 1× lens 7, the shielding member 9, and the line scan sensor 3 are arranged in a direction oblique to the normal direction of the input surface 6*a*. The 1× lens 7 forms the scintillation light output in the direction oblique to the normal direction of the input surface 6*a* into an image on the imaging surface 3*a*. The line scan sensor 3 captures an image of the scintillation light output in the direction oblique to the normal direction of the input surface 6*a*.

Referring back to FIG. 4, the positioning member 70 has a locking plate portion 79 in contact with a side surface of the housing body 13 and a main body portion 70*a* placed in the housing body 13. The first through hole 74 and the second through hole 75 are formed in the main body portion 70*a*. For example, a rectangular recess portion 70*c* is formed in the main body portion 70*a*. The positioning portion 61 of the holding member 60 is fitted in the recess portion 70*c*. In this manner, in the housing body 13, the holding member 60 is fitted and fixed in the positioning member 70 fixed to the housing body 13.

The positioning member 70 has a first positioning portion 71 that positions the scintillator 6 by making the input surface 6*a* of the scintillator 6 come into contact with the first positioning portion 71. The first positioning portion 71 is formed as part of the attachment surface 77 described above and has a flat surface. The first positioning portion 71 comes into surface contact with, for example, the input surface 6*a* of the scintillator 6.

The support member 80 fitted to the positioning member 70 supports the scintillator 6. The support member 80 has a support surface 82 facing the attachment surface 77 on which the first positioning portion 71 is formed. The tilt angle of the support surface 82 is equal to the tilt angle of the attachment surface 77 and hence the support surface 82 is parallel to the attachment surface 77. Both the attachment surface 77 and the support surface 82 have, for example, flat surfaces. The support member 80 holds the scintillator 6 between the attachment surface 77 and the support surface 82. The support member 80 is fixed to the positioning member 70 with an appropriate fixing means such as a screw such that an interval 89 (the distance in the normal direction of the support surface 82) between the attachment surface 77 and the support surface 82 can be adjusted. The size of the interval 89 is constant in, for example, the extending direction of the interval 89 (a direction along a tilted surface including the y-axis (a surface parallel to the attachment surface 77)).

Figure 8:
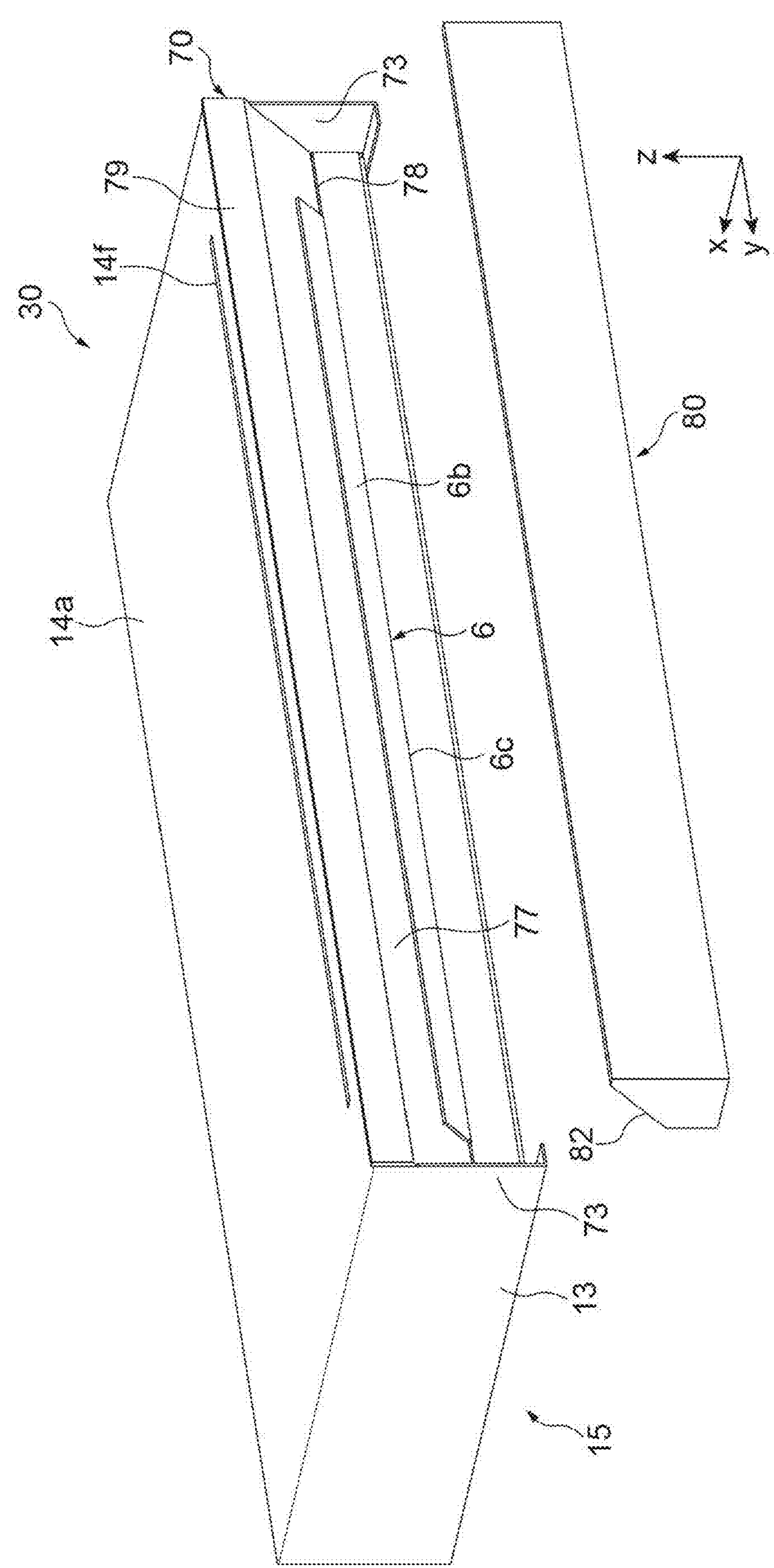
FIG. 8 is a view showing a state in which a support member is detached from a positioning member.

More specifically, as shown in FIG. 8, the positioning member 70 has a pair of side plate portions 73, 73 arranged at two ends in the y direction, and the support member 80 is fitted between the side plate portions 73, 73.

The positioning member 70 has a second positioning portion 72 with which one end face 7*a* of the 1× lens 7 comes into contact to position the imaging surface 3*a*. The second positioning portion 72 is formed as part of a side surface 76 facing the holding member 60 and has a flat surface. The second positioning portion 72 comes into surface contact with, for example, one end face 7*a* of the 1× lens 7.

Figure 5:
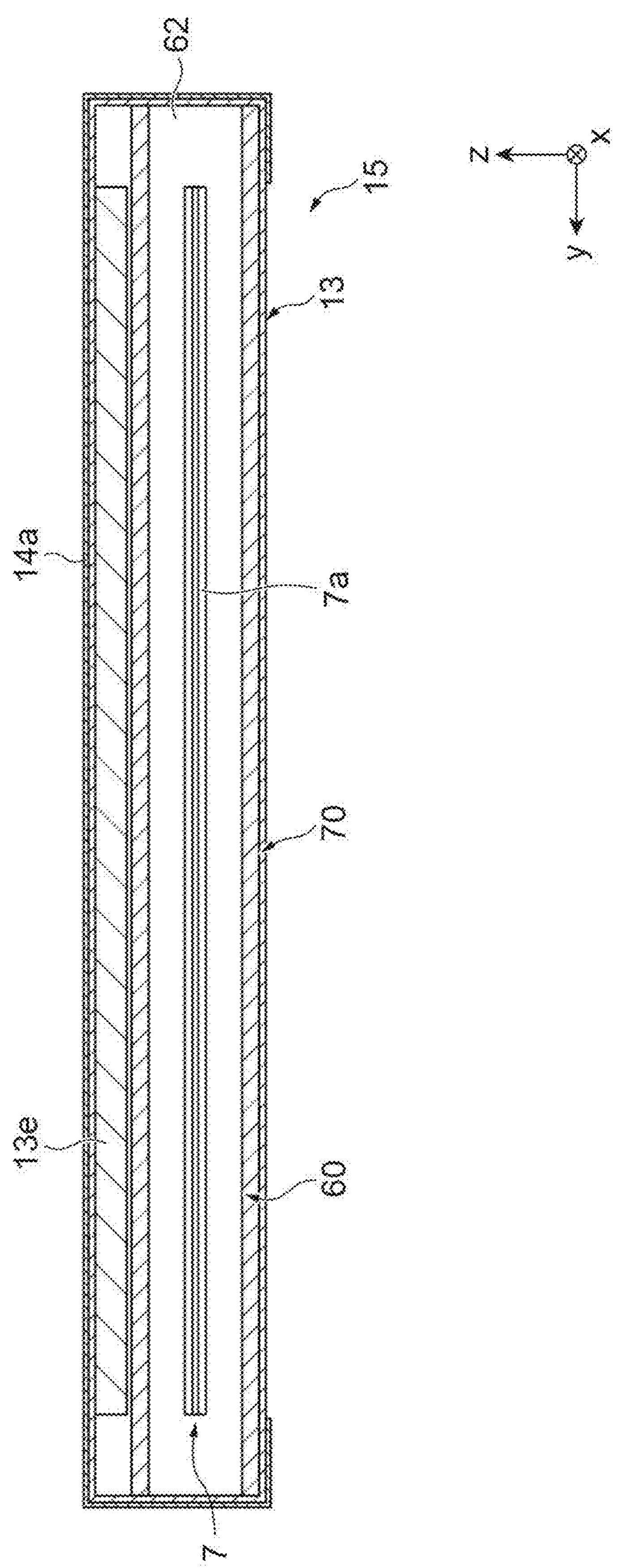
FIG. 5 is a sectional view taken along line V-V, showing one end face of a lens unit exposed on the surface of a holding member.

More specifically, the holding member 60 has a surface 62 facing the side surface 76 on which the second positioning portion 72 is formed, and a gap 69 is formed between the side surface 76 and the surface 62 which are two parallel surfaces. The gap 69 is formed along a y-z plane and is, for example, constant overall. The positioning member 70 and the holding member 60 are fixed with the gap 69. As shown in FIG. 5, one end face 7*a* of the 1× lens 7 is exposed on the surface 62. As shown in FIG. 4, one end face 7*a* of the 1× lens 7 protrudes from the surface 62 and is in contact with the side surface 76 of the positioning member 70. The protrusion length of one end face 7*a* is equal to the width of the gap 69.

With the above configuration, the positioning member 70 positions both the scintillator 6 and the 1× lens 7.

Figure 7:
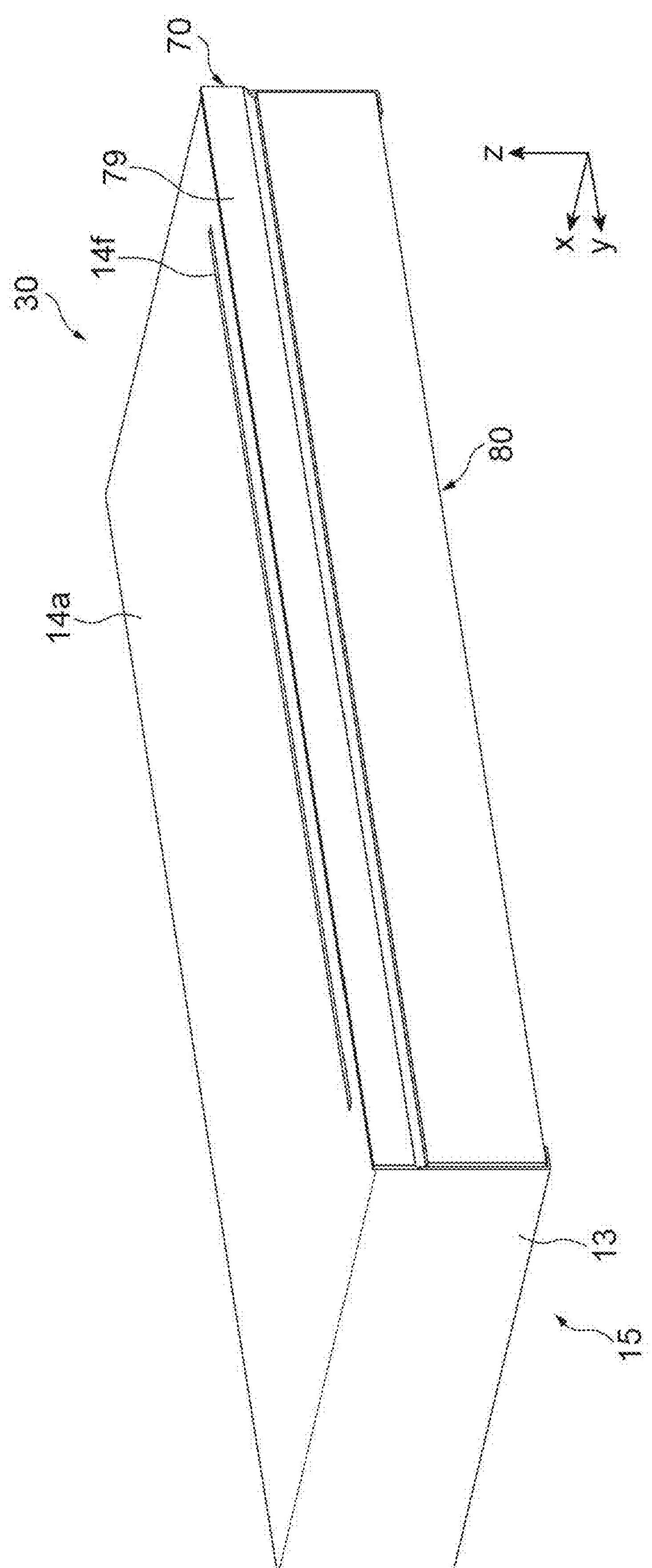
FIG. 7 is a perspective view showing the radiation detector in FIG. 3.
Figure 9:
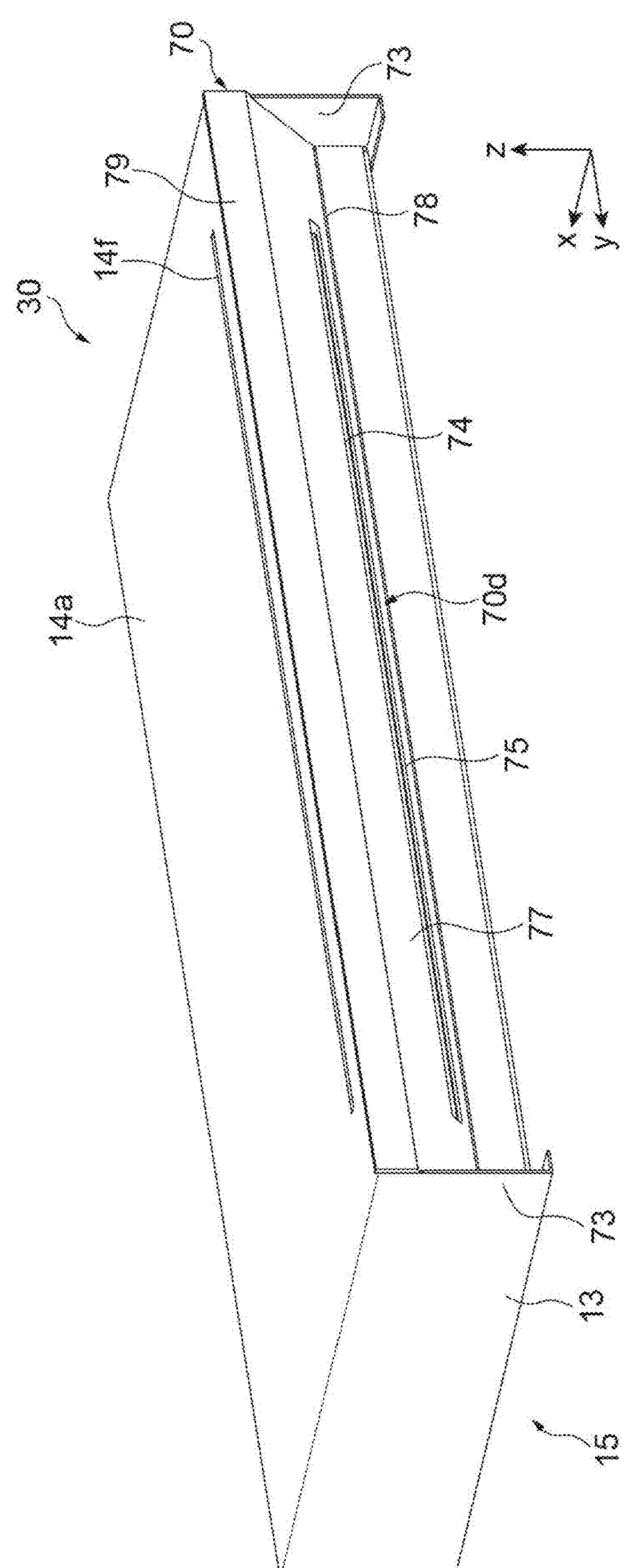
FIG. 9 is a view showing a state in which a scintillator is detached from the positioning member.

The attachment structure (attachment method) of the scintillator 6 with respect to the positioning member 70 will be described with reference to FIGS. 4, 8, and 9. The lower end portion (the end portion on the opposite side to the first through hole 74) of the attachment surface 77 of the positioning member 70 is provided with an L-shaped recess portion 78 that receives an end edge 6*c* of the scintillator 6. The recess portion 78 extends in the y direction and is formed throughout in the y direction (see FIG. 9). The scintillator 6 is pressed against the attachment surface 77, and the end edge 6*c* of the scintillator 6 is fitted into the recess portion 78 to stabilize the posture of the scintillator 6 (see FIG. 8). In this state, the input surface 6*a* of the scintillator 6 faces the opening 70*d* formed by making the first through hole 74 intersect the second through hole 75. As shown in FIG. 8, a reverse surface 6*b* of the scintillator 6 is exposed. Thereafter, the support member 80 is attached to the positioning member 70 (see FIG. 7) and fixed with an appropriate fixing means, thereby fixing the scintillator 6. As shown in FIG. 4, the support member 80 supports the scintillator 6 while the support surface 82 is in contact with the reverse surface 6*b* of the scintillator 6. The interval 89 equal to the thickness of the scintillator 6 is formed between the positioning member 70 and support member 80.

The recess portion 78 has, for example, a flat surface. The surface of the recess portion 78 may be orthogonal to the above tilted surface (the surface parallel to the attachment surface 77). The surface height of the recess portion 78 (the depth of the recess portion 78 or the length in a direction orthogonal to the y direction) may be substantially equal to the thickness of the scintillator 6 or may be smaller than the thickness of the scintillator 6. When the surface height (depth) is smaller than the thickness of the scintillator 6, the end face of the scintillator 6 which is in contact with the recess portion 78 protrudes from the recess portion 78. As the thickness of the scintillator 6 increases, the interval 89 increases. The position of the support member 80 changes (moves parallelly) in the x direction in accordance with the thickness of the scintillator 6, and the support member 80 may be fixed at an appropriate position. The depth of the recess portion 78 defines the minimum size of the interval 89. In order to reliably hold the scintillator 6 without any backlash, the depth of the recess portion 78 is set to be equal to or smaller than the thickness of the thinnest scintillator 6 that can be set in the radiation detector 30. The recess portion 78 is a notch portion or reception surface that is formed in the positioning member 70 and receives part or all (at least part in the thickness direction) of the end face of the scintillator 6.

Referring back to FIG. 2, the computer 10 includes, for example, a CPU (Central Processing Unit), ROM (Read Only Memory), RAM (Random Access Memory), and input/output interface. The computer 10 includes the control unit 10*a* (control processor) that controls the radiation source 2 and the line scan sensor 3 and an image processing unit 10*b* (image processor) that forms a radiological image of the object A based on the radiological image data output from the line scan sensor 3. The image processing unit 10*b* inputs radiological image data and executes predetermined processing such as image processing for the input radiological image data. A display device 11 is connected to the computer 10. The image processing unit 10*b* outputs the generated radiological image to the display device 11. The control unit 10*a* controls the radiation source 2 based on the values of tube voltage and tube current for the radiation source 2 which are, for example, input by the user and stored. The control unit 10*a* controls the line scan sensor 3 based on the exposure time and the like for the line scan sensor 3 which are, for example, input by the user and stored. The control unit 10*a* and the image processing unit 10*b* may be different processors or the same processor. In addition, the computer 10 may be programmed to execute the functions of the control unit 10*a* and the image processing unit 10*b*. Note that the computer 10 may be constituted by a microcomputer and an FPGA (Field-Programmable Gate Array).

Next, the operation of the radiological image acquisition system 1, that is, a method of acquiring a radiological image will be described. First, the object A is conveyed in the conveying direction D by using the conveying apparatus 20 (conveying step). Concurrently, the radiation source 2 outputs radiation such as white X-rays to the object A (radiation output step). Next, the radiation transmitted through the object A is made to enter the housing 15 through the entrance window 14*f*, and the slit formed in the housing 15 guides the radiation toward the input surface 6*a* of the scintillator 6 (radiation guiding step). The radiation transmitted through the object A is input to the input surface 6*a*. The scintillator 6 converts the radiation into scintillation light and outputs the scintillation light from the input surface 6*a* (scintillation light output step). The scintillation light output from the input surface 6*a* is formed into an image on the imaging surface 3*a* of the line scan sensor 3 by the 1× lens 7 (scintillation light image forming step). In addition, an image of the scintillation light is captured on the imaging surface 3*a* of the line scan sensor 3 (scintillation light imaging step). The line scan sensor 3 outputs the radiological image data obtained by imaging to the image processing unit 10*b* of the computer 10.

The image processing unit 10*b* of the computer 10 inputs radiological image data and executes predetermined processing such as image processing for the input radiological image data to form a radiological image (image forming step). The image processing unit 10*b* outputs the formed radiological image to the display device 11. The display device 11 displays the radiological image output from the image processing unit 10*b*. A radiological image based on surface observation of the object A is obtained through the above steps.

According to the radiation detector 30 according to this embodiment, the positioning member 70 as a single member positions the scintillator 6 using the first positioning portion 71 and positions the 1× lens 7 using the second positioning portion 72. Since the 6*a* of the scintillator 6 comes into contact with the first positioning portion 71, even if the scintillator 6 changes in thickness, for example, the positional accuracy of the input surface 6*a* can be easily secured. This can maintain the distance between the line scan sensor 3 and the input surface 6*a* of the scintillator 6 constant. This configuration eliminates the necessity to consider the positional accuracy of different members and hence is superior to conventional detectors. The distance between the input surface 6*a* of the scintillator 6 and one end face 7*a* of the 1× lens 7 is maintained constant, and the accuracy of focal length (the operating distance L1 shown in FIG. 6) is secured.

A conventional radiation detector requires focus adjustment every time the scintillator changes in thickness. In contrast to this, the radiation detector 30 according to this embodiment is configured such that the scintillator 6 is fixed while the input surface 6*a* of the scintillator 6 is in contact with the positioning member 70, and the distance between the input surface 6*a* and one end face 7*a* of the 1× lens 7 and the distance between the other end face 7*c* of the 1× lens 7 and the imaging surface 3*a* are fixed by themselves, and hence such sequential focal length adjustment is not necessary. The input surface 6*a* of the scintillator 6 can be easily brought close to one end face 7*a* of the 1× lens 7 regardless of the thickness of the scintillator 6. Since the 1× lens 7 as a rod lens array has a shallow depth of field, the positional accuracy of the input surface 6*a* of the scintillator 6 is very important. However, the radiation detector 30 can properly detect scintillation light emitted from the input surface 6*a*.

The first positioning portion 71 comes into surface contact with the input surface 6*a* of the scintillator 6 and hence can easily stabilize the posture of the scintillator 6. This further increases the positional accuracy of the input surface 6*a* of the scintillator 6.

The second positioning portion 72 comes into surface contact with one end face 7*a* of the 1× lens 7 and hence can reliably and easily fix the position of the 1× lens 7. This further increases the positional accuracy of the 1× lens 7.

In addition, only attaching the positioning member 70 to the holding member 60 will determine the relative position among the line scan sensor 3, the 1× lens 7, and the scintillator 6.

Since the positioning member 70 and the holding member 60 are fixed with the gap 69, the heat generated by the line scan sensor 3 is not easily transferred to the positioning member 70. By protecting the positioning member 70 from heat, the distance between the first positioning portion 71 and the second positioning portion 72 is made invariant and can be easily maintained. Even if each lens body 8 varies in characteristics, the influence of the variation can be compensated.

The position of the scintillator 6 can be easily fixed by the recess portion 78 formed in the positioning member 70.

In addition, only fitting the support member 80 to the positioning member 70 can reliably support and fix the scintillator 6. If, for example, the scintillator 6 deteriorates, the scintillator 6 can be easily replaced.

Since the support member 80 is fixed so as to allow adjustment of the interval 89, it is possible to adapt scintillators with any thickness.

Although the embodiment of the present disclosure has been described above, the present invention is not limited to the above embodiment. For example, the above embodiment has exemplified the form of bringing the first positioning portion into surface contact with the input surface of the scintillator. However, the first positioning portion may include three or more protruding portions, and the input surface of the scintillator may come into contact with the protruding portions. In this case, the distal ends of the protruding portions define a predetermined positioning plane for determining the position of the input surface of the scintillator. The distal end of each protruding portion (each portion that supports the scintillator) may be point-like or linear or may have an arbitrary planar shape. Alternatively, the distal end of each protruding portion may have a shape by combining any of these shapes.

The above embodiment has exemplified the form of bringing the second positioning portion into contact with one end face of the lens unit. However, the second positioning portion may include three or more protruding portions, and one end face of the lens unit may come into contact with the protruding portions. In this case, the distal ends of the protruding portions define a predetermined positioning plane for determining the position of one end face of the lens unit. The distal end of each protruding portion (each portion that supports the lens unit) may be point-like or linear or may have an arbitrary planar shape. Alternatively, the distal end of each protruding portion may have a shape by combining any of these shapes.

The configuration of the holding member can be changed as appropriate. For example, the portion that holds the lens unit and the portion that holds the sensor unit may be separate components. A holding member like that described in the above embodiment may be omitted, and the lens unit and/or the sensor unit may be fixed in the housing by using other appropriate holding means (brackets and the like).

The shape of the recess portion can be changed as appropriate. The recess portion need not always be provided in the positioning member. The present invention may use a configuration in which a scintillator is in contact with one flat surface formed on a positioning member, while the end edge of the scintillator is in contact with another flat surface intersecting the flat surface. That is, although the recess portion in the above embodiment has three flat surfaces, the positioning member may have only two flat surfaces in contact with the scintillator.

The support member may be omitted. In this case, the present invention may use an attachment structure configured to fix a scintillator by fitting it into a positioning member, or other fixtures for fixing the scintillator to the support member may be attached to the scintillator.

The slit that is a radiation passage may be formed from a member different from the positioning member 70. The holding member 60 may not be fitted in the positioning member 70 and may be fixed to another portion in the housing 15.

INDUSTRIAL APPLICABILITY

According to several aspects of the present disclosure, it is possible to easily ensure the positional accuracy of the input surface of the scintillator and accordingly maintain the distance between the sensor unit and the input surface of the scintillator constant.

REFERENCE SIGNS LIST

1 . . . radiological image acquisition system, 3 . . . line scan sensor (sensor unit), 3*a* . . . imaging surface, 6 . . . scintillator, 6*a* . . . input surface, 7 . . . 1× lens (lens unit), 7*a* . . . one end face, 8 . . . lens body (lens), 15 . . . housing, 20 . . . conveying apparatus, 30 . . . radiation detector, 60 . . . holding member, 62 . . . surface, 69 . . . gap, 70 . . . positioning member, 71 . . . first positioning portion, 72 . . . second positioning portion, 74 . . . first through hole, 75 . . . second through hole, 76 . . . side surface, 77 . . . attachment surface, 78 . . . recess portion, 80 . . . support member, 82 . . . support surface, 89 . . . interval

The invention claimed is:

1. A radiation detector comprising:

a positioning member having a through hole through which radiation passes;

a scintillator having an input surface to which the radiation passing through the through hole is input and configured to convert the radiation into scintillation light;

a sensor unit having a light-receiving surface that receives the scintillation light converted by the scintillator and configured to detect the scintillation light; and a lens unit having a lens configured to perform image capturing on the input surface of the scintillator and the light-receiving surface of the sensor unit, wherein the positioning member has a first positioning portion with which at least a part of the input surface of the scintillator comes into contact to position the scintillator, and wherein the position member has a second positioning portion with which at least a part of one end face of the lens unit comes into contact to position the lens unit.

2. The radiation detector according to claim 1, wherein the first positioning portion comes into surface contact with the input surface of the scintillator.

3. The radiation detector according to claim 1, wherein the second positioning portion comes into surface contact with the one end face of the lens unit.

4. The radiation detector according to claim 1, wherein the first positioning portion comes into surface contact with the input surface of the scintillator and the second positioning portion comes into surface contact with the one end face of the lens unit.

5. The radiation detector according to claim 1, further comprising a holding member configured to hold the lens unit and the sensor unit, wherein the holding member has a surface facing a side surface on which the second positioning portion of the positioning member is formed, and the one end face of the lens unit is exposed on the surface.

6. The radiation detector according to claim 5, wherein the positioning member and the holding member are fixed with a gap between the side surface and the surface.

7. The radiation detector according to claim 1, wherein the positioning member has a recess portion that receives an end edge of the scintillator.

8. The radiation detector according to claim 1, further comprising a support member that is fitted to the positioning member to support the scintillator, wherein the support member has a support surface facing an attachment surface on which the first positioning portion of the positioning member is formed and holds the scintillator between the attachment surface and the support surface.

9. The radiation detector according to claim 8, wherein the support member is fixed to the positioning member so as to allow adjustment of an interval between the attachment surface and the support surface.

* * * * *